US008341885B2

(12) United States Patent
Bostyn

(10) Patent No.: US 8,341,885 B2
(45) Date of Patent: Jan. 1, 2013

(54) DOOR CONTROL SYSTEM WITH OBSTACLE DETECTION

(75) Inventor: Frédéric Bostyn, Flobecq (BE)

(73) Assignee: Dynaco Europe, Moorsel (BE)

( * ) Notice: Subject to any disclaimer, the term of this patent is extended or adjusted under 35 U.S.C. 154(b) by 117 days.

(21) Appl. No.: 12/889,099

(22) Filed: Sep. 23, 2010

(65) Prior Publication Data

US 2012/0073200 A1 Mar. 29, 2012

(51) Int. Cl.
*G05B 13/00* (2006.01)
*G05B 19/00* (2006.01)

(52) U.S. Cl. ................................................ 49/28; 49/26

(58) Field of Classification Search ................ 49/26–28, 49/360; 318/264–266, 272, 275, 277, 282, 318/286, 466–469
See application file for complete search history.

(56) References Cited

U.S. PATENT DOCUMENTS 4,452,292 A 6/1984 Leivenzon et al.
5,198,974 A 3/1993 Orsat
6,150,785 A * 11/2000 Butscher et al. .............. 318/468
6,779,302 B2 * 8/2004 Harrison et al. .................. 49/26
6,873,127 B2 * 3/2005 Murray ......................... 318/286
6,879,122 B1 * 4/2005 Stewart et al. ................ 318/280
6,989,767 B2 1/2006 Fitzgibbon et al.
7,019,478 B2 * 3/2006 Gregori et al. ................ 318/282
7,034,682 B2 4/2006 Beggs et al.
7,034,686 B2 4/2006 Matsumura
7,038,409 B1 * 5/2006 Mullet .......................... 318/280
7,042,183 B2 * 5/2006 Fitzgibbon et al. ........... 318/445
7,122,981 B2 * 10/2006 Knab et al. .................... 318/283
7,138,912 B2 * 11/2006 Fitzgibbon et al. ........... 340/521
7,196,611 B2 * 3/2007 Robb et al. ................... 340/5.71
7,432,676 B2 * 10/2008 Keller et al. .................. 318/266
7,521,881 B2 * 4/2009 VanDrunen et al. ............ 318/66
2003/0154656 A1 * 8/2003 Fitzgibbon et al. ............... 49/26
2004/0056623 A1 * 3/2004 Hormann ....................... 318/469
2006/0138987 A1 * 6/2006 McMahon ..................... 318/466
2006/0197481 A1 * 9/2006 Hotto et al. ................... 318/280
2007/0001637 A1 * 1/2007 Murphy et al. ............... 318/466
2007/0090781 A1 * 4/2007 Keller et al. .................. 318/264
2007/0261305 A1 11/2007 Kraeutler
2008/0224642 A1 * 9/2008 Rodriguez et al. ............ 318/466

* cited by examiner

*Primary Examiner* — Katherine W Mitchell
*Assistant Examiner* — Justin Rephann
(74) *Attorney, Agent, or Firm* — Reichel IP LLP; Kevin R. Erdman; Mark C. Reichel

(57) ABSTRACT

System for controlling a door enabling driving from an initial position of its travel in a first direction at a speed v1 as far as a final position, said control system comprising a safety function comprising means for keeping a door in operation despite its having suffered an impact against an obstacle situated on its travel and enabling it to continue its initial movement automatically as soon as said obstacle is removed, through a design reconciling a sufficiently high normal speed of movement v1 of the door with the intention to prevent damage both to the obstacle and to the door by reducing the speed to v3<v1 close to the stored position of the impact.

27 Claims, 4 Drawing Sheets

DOOR CONTROL SYSTEM WITH OBSTACLE DETECTION

FIELD OF THE INVENTION

The invention relates to a door control system with obstacle detection.

1. Introduction

When a door is opened or closed, it happens that obstacles formed by objects or persons may accidently be situated on its travel. It is necessary to protect both the door and these obstacles by means of a control system equipped with a safety function aimed at managing the accidental presence of obstacles, in particular by stopping the door in its travel when it encounters one and moving it away from the obstacle in order to be able to remove it. Said safety device must react promptly and reliably since tardy reaction or an absence of reaction may cause firstly dangerous crushing or overturning of the obstacle and secondly damage to the door.

Moreover, such a door control system should be able to make it continue its initial movement, as quickly as possible and automatically, as soon as the obstacle has been removed. This requirement is dictated in particular by considerations such as energy savings, protection against external attacks such as wind, rain and theft, the maintenance of controlled atmospheres (for example in refrigerated storage, clean rooms, and so on) etc. In addition, said door control system must on this occasion protect both the door and the obstacle in order to avoid damaging them.

2. Background art

In the prior art such control systems with obstacle detection are known, which offer a certain degree of protection during operation of the doors, and in particular flexible fast-acting doors, through the detection of any obstacles that might be situated on the travel of the door.

Some obstacle detection systems are contactless, that is to say they enable an obstacle to be detected before impact. The U.S. Pat. No. 7,034,686 B2 for example discloses a proximity detector provided with an antenna, which triggers a command to stop and reverses the closure of the vertical door when the magnetic field created by the antenna is disturbed by a close object. Such as system lacks precision given that the magnetic field may radiate outside the closure plane and thus cause false alarms triggered by objects situated close to the door but not underneath it.

Obstacles may also be detected using a complex computer system such as the one disclosed in the U.S. Pat. No. 5,198,974 A1 in which the variation in the speed of a door pulley is recorded and compared with a reference speed curve stored in memory, in order to establish whether or not there is an obstacle.

Other detection systems may comprise contact detectors disclosed for example in US 2007/0261305 A1. Detection of a contact during the door closure phase generates a signal, generally electrical, which causes the stoppage of the door closure phase.

Each of documents U.S. Pat. No. 7,034,682 B2, U.S. Pat. No. 6,989,767 B2, U.S. Pat. No. 5,198,974 A and US 2007/0261305 A1 concerns safety systems for doors in which, as soon as the obstacle is detected, the motor stops, reverses its direction of rotation in order to open the door completely and stops definitively when the door is completely open. The door can be closed once again by manual intervention.

The document U.S. Pat. No. 4,452,292 concerns a door control system where, after detection of an obstacle during closure therefore, the motor stops and reverses its direction of rotation to enable the obstacle to be removed, and then resumes its rotation in the direction of closure. Different cycles are described in the case where the obstacle has not been removed in time. However, in the cycles described in this document, the door closes on each occasion at constant speed which, firstly, if the speed is high, does not particularly protect either the door or the obstacle and secondly, if the speed is low, gives rise to an excessively long closure time.

A need therefore remains with regard to a simple and reliable door closure system, able to make it continue its initial movement, after repeated impacts on an obstacle, as quickly as possible and automatically as soon as the obstacle is removed, while on this occasion protecting both the door and the obstacle.

SUMMARY OF THE INVENTION

The first aim of the invention is to procure a simple and reliable door control system, able to make it continue its initial movement after repeated impacts on the same obstacle as quickly as possible and automatically as soon as the obstacle is removed, while on this occasion preventing damage both to the door and to the obstacle.

The exemplary embodiments of the present invention comprises in particular a system for controlling a door intended for closing a structure opening or any type of opening, enabling driving from an initial control position, $P_i$, of its travel in a first direction at a speed v1 as far as a final control position, $P_f$, said control system comprising a safety function comprising means for performing the following steps in the event of impact with an obstacle obstructing the path of said door in the first direction:

(a) Detection of the impact, stoppage of the motor, and storage of the impact position, $P_{impact}$, followed by (b) Reversal of the travel of the door by driving it in a second direction, opposite to the first, at a speed v2 as far as a waiting position, $P_{waiting}$, predetermined so as to leave sufficient space for removing the obstacle;

(c) After a waiting time, $\Delta t_{waiting}$, in the waiting position, $P_{waiting}$, driving of the door in the first direction at the speed v1 as far as a predetermined position $P_3$ situated upstream of the impact position $P_{impact}$, at which point the speed of driving the first direction is reduced to the value v3, with $0<v3<v1$;

(d) If the door driven in the first direction at the reduced speed v3 no longer detects an obstacle at the position $P_{impact}$, increasing the speed of driving in the first direction to the value v1 until the door reaches its final control position $P_f$;

(e) If on the other hand the door driven in the first direction at reduced speed v3 once again detects the obstacle at the same position $P_{impact}$, the cycle defined by steps (a) to (c) is repeated and step (d) is executed if the conditions defined therein are fulfilled;

(f) If after a predetermined number N of repetitions of said cycle the obstacle is still detected, driving of the door in the second direction at speed v2 and stopping of the door at a predetermined stop position $P_{stop}$, until manual reactivation of the control system.

The advantage of the invention is to keep a door in operation despite the presence of an obstacle at the position $P_{impact}$ on its travel and to enable it to continue its initial movement automatically as soon as said obstacle is removed, through a simple design reconciling both the operational requirements, that is to say a sufficiently high normal speed of movement v1 of the door, with the intention to prevent damage both to the obstacle and to the door by reducing this speed to $v3<v1$ close to the impact position $P_{impact}$, in order to reduce the energy of a potential impact (energy $\propto v^2$), should the obstacle not have been removed at the time of the second passage of the door through the position $P_{impact}$. The number n of passages of the door through the position $P_{impact}$ defining n cycles is limited to a maximum value N in order to limit the number of impacts at reduced speed v3 in the case of prolonged maintenance of the obstacle on the path of the door, which helps to protect it. In the same way the energy costs are compressed. In the case of impact at a different height, the value of the number n of cycles is reinitialised to 1.

BRIEF DESCRIPTION OF THE FIGURES

These aspects as well as other aspects of the invention will be clarified in the detailed description of particular embodiments of the invention, reference being made to the drawings in the figures, in which.

Figure 1:
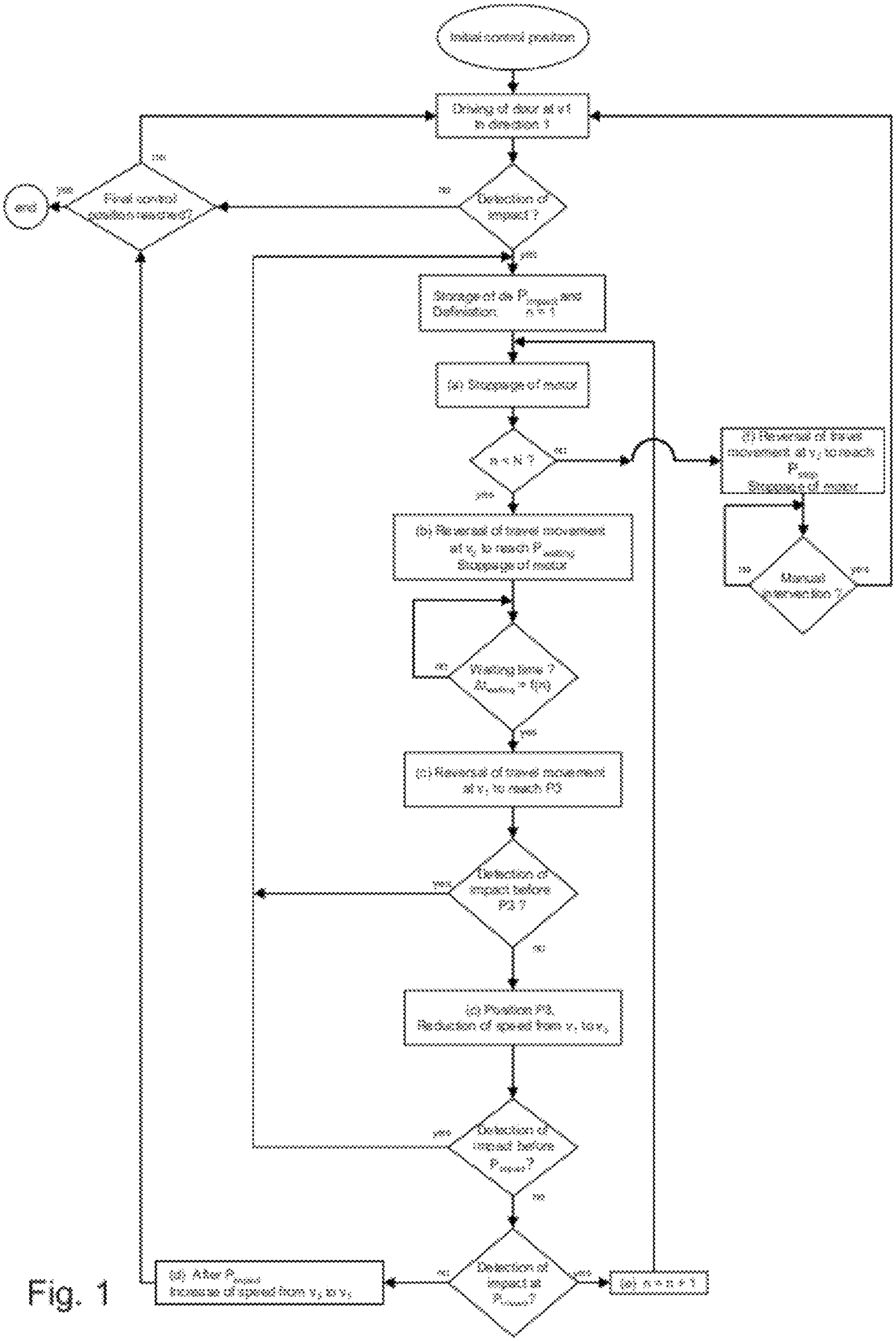
FIG. 1 is a flow diagram illustrating an example of operation of a system according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts and graphs are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION OF PARTICULAR EMBODIMENTS

The present invention applies to any type of door, the definition of which is to be taken in the broad sense, comprising any structure for the reversible closure of an opening or doorway. The door according to the invention may be rigid or on the contrary flexible, and movement thereof enabling reversible closure of the opening may be linear or angular. The door may be mounted vertically, but may also be inclined, or even horizontal in the case of horizontal openings.

In the context of the present invention, the first direction defines the direction of movement of the door for passing from the initial control position P, to the final position $P_f$. The "normal" movement speed, that is to say unless provided for to the contrary in the context of a specific step of the safety function, has the value v1. If the command is to close the door, then the first direction defines the direction of closure and the speed v1 the closure speed. Conversely, if the command is to open, the first direction defines the direction of opening and the speed v1 the opening speed. In a similar manner, the second direction, being opposed to the first, defines the direction and speed v2 of opening and closing respectively.

FIG. 1 illustrates a flow diagram of a control program according to the invention, commencing with an initial position $P_i$ from which the movement of the door commences in a first direction at a first "normal" speed v1. If no impact is detected as far as the desired final position $P_f$, the door continues its movement at speed v1 as far as the position $P_f$, where it stops. On the other hand, if the door comes up against an obstacle during its travel, the impact is detected by the system by means known to persons skilled in the art, the principle of which has no influence on the present invention, as long as they afford reliable and rapid detection of an impact. At this moment, the position of the impact, $P_{impact}$, is recorded, the motor is stopped and the first cycle of the safety function is initiated (n=1). The travel of the door is then reversed in the second direction, opposite to the first, and the door is driven at speed v2 towards the waiting position, $P_{waiting}$, where it stops for a predetermined length of time, $\Delta t_{waiting}$, to enable the obstacle to be removed (see FIG. 2).

According to a preferred embodiment, the value of $\Delta t_{waiting}$ is constant for all the N cycles. Alternatively the value of $\Delta t_{waiting}$ increases after each cycle. The advantage of the latter embodiment is that, if removing the obstacle from the path of the door proves to be difficult, extension of the period of time to the following cycle gives more time to the operators to remove the obstacle. According to another embodiment of the invention, the waiting position $P_{waiting}$ is fixed for all the N cycles and may be the initial control position $P_i$. However, said waiting position may change with the number of cycles n and therefore of course also differ from the initial position $P_i$.

Once the time $\Delta t_{waiting}$ has elapsed, the door starts off again in the first direction at the speed v1, as far as a position $P_3$ situated upstream of and close to the impact position $P_{impact}$. At the position $P_3$, the control system gives the instruction to reduce the speed from v1 to the value v3, with $0<v3<v1$ (see FIG. 2). Advantageously, the value of v3 decreases with the number of cycles, and/or the reduction in speed from v1 to v3 takes place gradually as the position of the door approaches the impact position $P_{impact}$. Alternatively, the system may instruct the door to change from the speed v1 to the speed v3 instantaneously, which, in practice and because of the inertia of the door, results in a progressive passage from one speed to the other; in FIG. 2, the command to change speed from v1 to v3 is instantaneous. These measures aim to limit further the energy of repeated impacts and the wear and the damage that would result therefrom. This is because, as the impact energy is proportional to the square of the impact speed, the damage is thus greatly reduced in the case where the obstacle is always in the same position. On the other hand, if the door were to move at the reduced speed v3 from the waiting position $P_{waiting}$ as far as the impact position $P_{impact}$, or even as far as the final position $P_f$, if the obstacle had been removed the movement of the door would be much too slow and this would take much too long.

Figure 2:
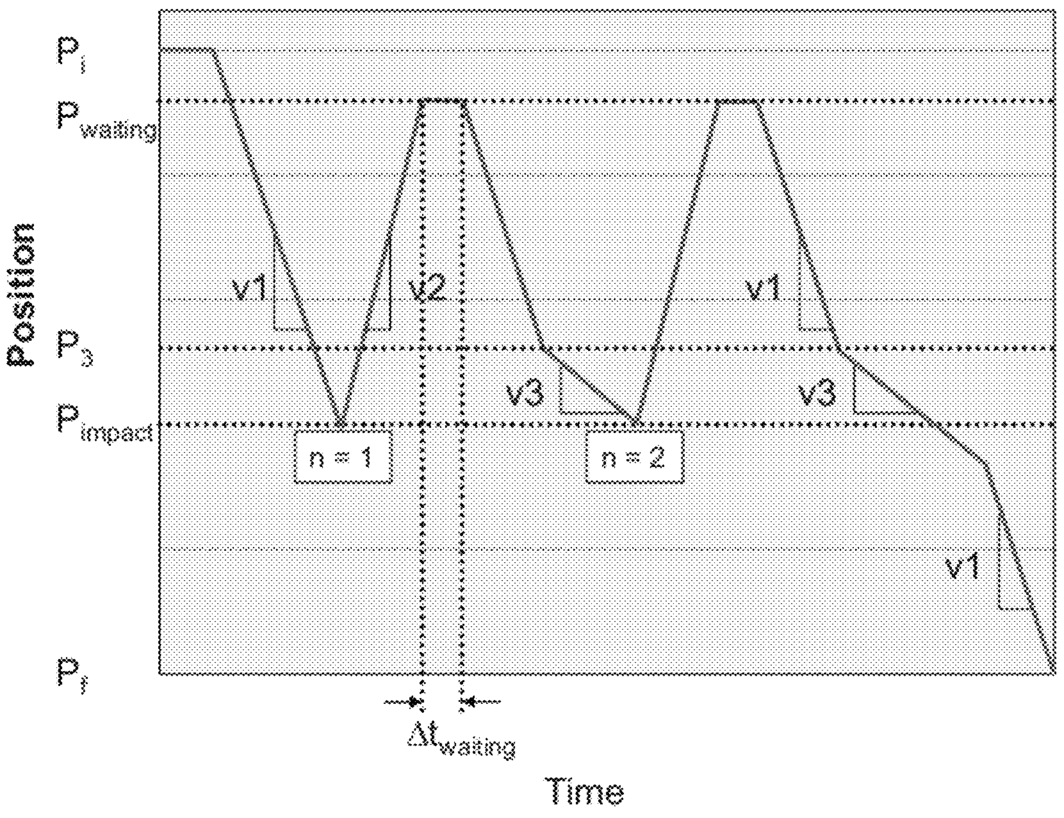
FIG. 2 is a graphical representation of the control of the safety function triggered by an impact on a door during movement thereof according to an embodiment of the control system of the present invention.

If the obstacle has been removed and the system no longer detects an impact when the door reaches the impact position $P_{impact}$, the command is given to increase the speed of movement to the "normal" value v1, which is maintained until the door reaches its final control position $P_f$ (see FIG. 2, 2nd cycle (n=2)).

If on the other hand the system detects a new impact at the position $P_{impact}$, since it has not been possible to remove the obstacle in time, the system initiates a second cycle by stopping the motor, determining whether the maximum number N of cycles has not been reached, reversing the travel, etc. If the obstacle is not removed after a predetermined number N of impacts, the system leaves the loop, reverses the travel of the door in the second direction and drives the door at the speed v2 as far as the position $P_{stop}$, when the door is stopped until the control is manually reactivated. This case presents itself for example if the obstacle cannot be moved or if there is no person to move it. The stop position $P_{stop}$ may correspond to the initial position $P_i$, or take any value upstream (with respect to the first direction) of the impact position $P_{impact}$.

Figure 3:
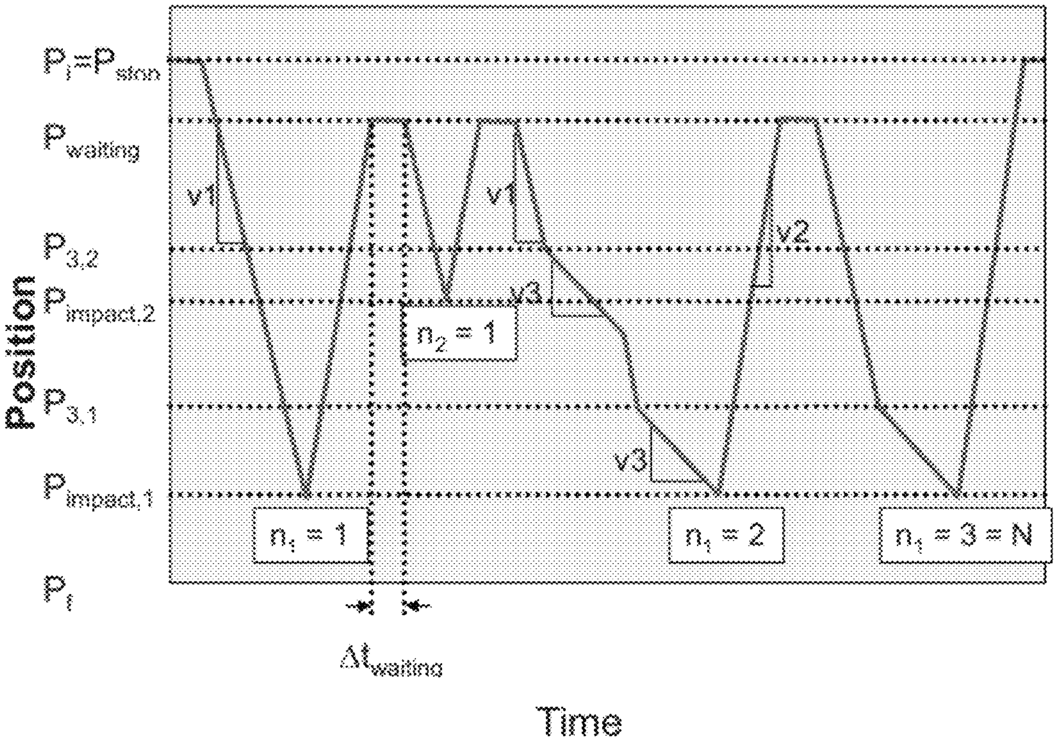
FIG. 3 is a graphical representation of the control of the safety function triggered by two impacts on a door at different travel positions during movement thereof.

If during a cycle a new impact occurs at any position different from the position $P_{impact}$ of the first impact, the cycle counter is reinitialised to n=1 and the safety function is applied once again for this new impact. According to a variant of the invention, the case of a second impact erases the memory of the first impact. However, should the second impact have taken place upstream (with respect to the first direction) of the position of the first impact $P_{impact}$, it may be dangerous to ignore the possible presence of the first obstacle once the second has been removed from the path of the door. To overcome this problem it is possible to keep in memory several impact positions during the application of a safety function, the system thus managing a "cascade" of impacts by defining the positions $P_{impact,k}$, $P_{3,k}$, $P_{waiting,k}$ distributed over the path lying between the initial and final control positions $P_i$ and $P_f$, and a number of cycles $n_k$ where k refers to a particular impact (see FIG. 3).

The control system according to an exemplary embodiment of the invention preferably controls a door that is a flexible shutter, either in the form of a flexible material (for example a textile fabric or a polymeric or metallic film) or consisting of rigid elements connected to each other in a movable fashion, such as a slatted shutter. In the case of flexible shutters, the path of the shutter is generally linear, such as for example a vertical shutter the opening of which is generated by the upward movement of the shutter. Alternatively, the door may be rigid, the path of which is either linear or angular, for example if the door is mounted on hinges or a rotation shaft.

Figure 6:
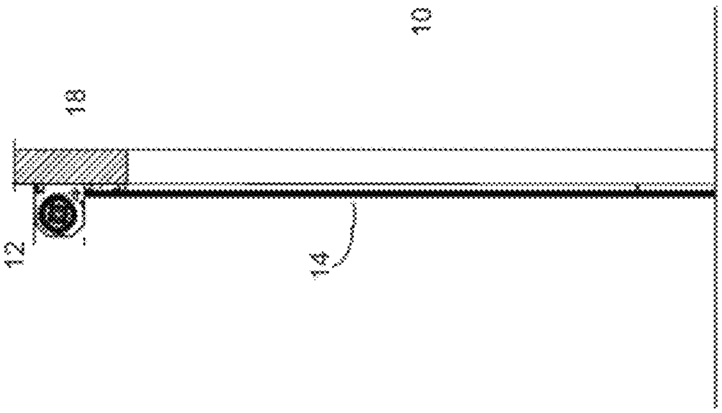
FIG. 6 is a side elevational view line drawing of the exemplary system shown in FIGS. 4 and 5.
Figure 4:
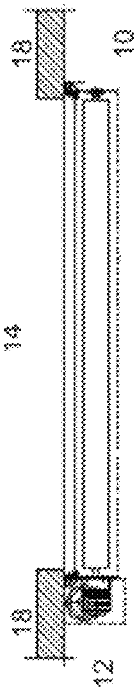
FIG. 4 is a plan view line drawing of an exemplary system according to one embodiment of the present invention.
Figure 5:
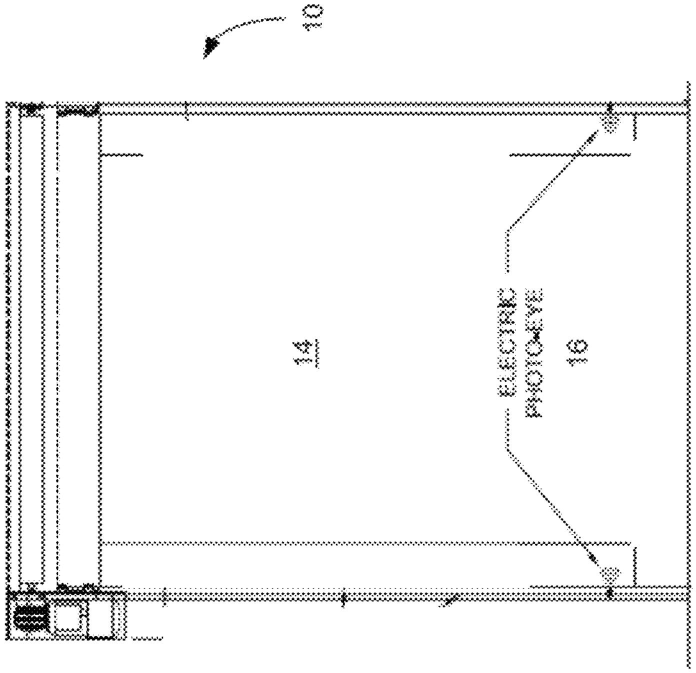
FIG. 5 is a front elevational view line drawing of the exemplary system shown in FIG. 4.

One exemplary embodiment of the invention is shown in FIGS. 4-6. System 10 includes motor and control 12 that serves as motive means for moving door 14 which may be of the varieties disclosed above or other suitable structures. Proximate door 14 is sensor 16, in this exemplary embodiment an electric photo-eye, although other sensing technologies may be used such as object or motion sensors, magnetic or induction sensors. Sensor 16 serves as sensing means for sensing conditions proximate door 14, and is coupled to a safety function device, such as a microprocessor and related memory or an application specific integrated circuit which may be disposed in motor and control 12 or otherwise associated with system 10, that serves as means for performing the control program disclosed above.

Preferably the "normal" speed in the direction of closure of the door is less than the opening speed, in particular in the case of a flexible or rigid vertical door with linear path, the closure of which is generated by the descent of the door since, in this case, an impact can take place only in the case where the first direction is the closing direction. The energy of such a potential impact is thus reduced in order to prevent straightaway significant damage to the door and to the obstacle by lowering the door at a speed v1 less than the speed v2 of opening in the second direction, since the door should not normally encounter the obstacle when it is rising.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A system for controlling a door, enabling driving from an initial control position, $P_i$ of its travel in a first direction at a speed v1 as far as a final control position, $P_f$, said safety function control system comprising motor, control and sensing means, and a safety function comprising means for performing the following steps in the event of impact with an obstacle obstructing the path of said door in the first direction involving the control having a program that when executed performs:

(a) detection of the impact, stoppage of the motor, and storage of an impact position, $P_{impact}$, followed by (b) reversal of the travel of the door by driving it in a second direction, opposite to the first direction, at a speed v2 as far as a waiting position, $P_{waiting}$, predetermined so as to leave sufficient space for removing the obstacle;

(c) after a waiting time, $\Delta t_{waiting}$, in the waiting position, $P_{waiting}$, driving of the door in the first direction at the speed v1 as far as a predetermined position $P_3$ situated upstream of before the impact position $P_{impact}$, at which point the speed of driving the first direction is reduced to a value v3, with 0<v3<v1;

(d) if the door driven in the first direction at a reduced speed of v3 no longer detects an obstacle at the position $P_{impact}$, increasing the speed of driving in the first direction to the value v1 until the door reaches its final control position $P_f$, (e) if on the other hand the door driven in the first direction at reduced speed v3 once again detects the obstacle at the same position $P_{impact}$, the cycle defined by steps (a) to (c) is repeated and step (d) is executed if the door no longer detects an obstacle at the position $P_{impact}$, (f) if after a predetermined number N of repetitions of said cycle the obstacle is still detected, driving of the door in the second direction at speed v2 and stopping of the door at a predetermined stop position $P_{stop}$, until manual reactivation of the control system.

2. The system according to claim 1, wherein the value of $\Delta t_{waiting}$ is constant for all the N cycles.

3. The system according to claim 1, wherein the value of $\Delta t_{waiting}$ increases after each cycle.

4. The system according to claim 1, wherein the waiting position is fixed for all the N cycles.

5. The system according to claim 1, wherein the waiting position changes with the number of cycles.

6. The system according to claim 1, wherein the first direction defines the direction of closure of the door and v2≧v1.

7. The system according to claim 1, wherein the value of v3 decreases with the number of cycles.

8. The system according to claim 1, wherein the reduction in the speed from v1 to v3 takes place gradually while the position of the door approaches the point of impact Pimm.

9. The system according to claim 1, wherein the waiting position $P_{waiting}$ and/or the stop position $P_{stop}$ correspond to the initial control position $P_i$.

10. The system according to claim 1, wherein the travel of the door is linear.

11. The system according to claim 1, wherein the travel of the door is angular.

12. The system according to claim 1, wherein the door is rigid.

13. The system according to claim 1, wherein the door is a flexible shutter.

14. A method for performing a safety function in controlling a door, enabling driving from an initial position, $P_i$, of its travel in a first direction at a speed v1 as far as a final control position, $P_f$, said safety function control system comprising a safety function comprising means for the performing of the following steps, in the event of impact with an obstacle obstructing the path of said door in the first direction, by means of a control system comprising motor, control and sensing means, the control having a program that when executed performs:

(a) detection of the impact, stoppage of the motor, and storage of an impact position, $P_{impact}$, followed by (b) reversal of the travel of the door by driving it in a second direction, opposite to the first direction, at a speed v2 as far as a waiting position, $P_{waiting}$, predetermined so as to leave sufficient space for removing the obstacle;

(c) after a waiting time, $\Delta t_{waiting}$, in the waiting position, $P_{waiting}$, driving of the door in the first direction at the speed v1 as far as a predetermined position $P_3$ situated before the impact position $P_{impact}$, at which point the speed of driving the first direction is reduced to a value v3, with 0<v3<v1;

(d) if the door driven in the first direction at a reduced speed of v3 no longer detects an obstacle at the position $P_{impact}$, increasing the speed of driving in the first direction to the value v1 until the door reaches its final control position $P_f$;

(e) if the door driven in the first direction at reduced speed v3 once again detects the obstacle at the same position $P_{impact}$, the cycle defined by steps (a) to (c) is repeated and step (d) is executed if the door no longer detects an obstacle at the position $P_{impact}$, (f) if after a predetermined number N of repetitions of said cycle the obstacle is still detected, driving of the door in the second direction at speed v2 and stopping of the door at a predetermined stop position $P_{stop}$, until manual reactivation of the control system.

15. The method according to claim 14, wherein the value of $\Delta t_{waiting}$ is constant for all the N cycles.

16. The method according to claim 14, wherein the value of $\Delta t_{waiting}$ increases after each cycle.

17. The method according to claim 14, wherein the waiting position is fixed for all the N cycles.

18. The method according to claim 14, wherein the waiting position changes with the number of cycles or corresponds to the initial control position $P_i$.

19. The method according to claim 14, wherein the first direction defines the direction of closure of the door and $v2 \geqq v1$.

20. The method according to claim 14, wherein the value of v3 decreases with the number of cycles.

21. The method according to claim 14, wherein the reduction in the speed from v1 to v3 takes place gradually while the position of the door approaches the point of impact $P_{impact}$.

22. The method according to claim 14, wherein the waiting position $P_{waiting}$ and/or the stop position $P_{stop}$ correspond to the initial control position $P_i$.

23. The method according to claim 14, wherein the travel of the door is linear.

24. The method according to claim 14, wherein the travel of the door is angular.

25. The method according to claim 14, wherein the door is rigid.

26. The method according to claim 14, wherein the door is a flexible shutter.

27. A system for controlling a door, enabling driving from an initial control position, $P_i$, of its travel in a first direction at a speed v1 as far as a final control position, $P_f$, said control system comprising motive means for moving the door including a motor, sensing means for sensing conditions proximate the door including a sensor, and a safety function comprising means including a control for performing the following steps in the event of impact with an obstacle obstructing the path of said door in the first direction, the control having a program that when executed performs:

(a) detection of the impact, stoppage of the motor, and storage of an impact position, $P_{impact}$, followed by (b) reversal of the travel of the door by driving it in a second direction, opposite to the first direction, at a speed v2 as far as a waiting position, $P_{waiting}$, predetermined so as to leave sufficient space for removing the obstacle;

(c) after a waiting time, $\Delta t_{waiting}$, in the waiting position, $P_{waiting}$, driving of the door in the first direction at the speed v1 as far as a predetermined position P; situated before the impact position $P_{impact}$, at which point the speed of driving the first direction is reduced to a value v3, with 0<v3<v1;

(d) if the door driven in the first direction at a reduced speed of v3 no longer detects an obstacle at the position $P_{impact}$, increasing the speed of driving in the first direction to the value v1 until the door reaches its final control position $P_r$;

(e) if the door driven in the first direction at reduced speed v3 once again detects the obstacle at the same position $P_{impact}$, the cycle defined by steps (a) to (e) is repeated and step (d) is executed if the door no longer detects an obstacle at the position $P_{impact}$;

(f) if after a predetermined number N of repetitions of said cycle the obstacle is still detected, driving of the door in the second direction at speed v2 and stopping of the door at a predetermined stop position $P_{stop}$, until manual reactivation of the control system wherein the value of $\Delta t_{waiting}$ is constant for all the N cycles.

* * * * *